US010681068B1

(12) United States Patent
Galliano et al.

(10) Patent No.: US 10,681,068 B1
(45) Date of Patent: Jun. 9, 2020

(54) SYSTEM AND METHOD FOR ANALYZING DATA AND USING ANALYZED DATA TO DETECT CYBER THREATS AND DEFEND AGAINST CYBER THREATS

(71) Applicants: Christopher Galliano, New Orleans, LA (US); Raed Albuliwi, Lewisville, TX (US); Kent Laursen, Slidell, LA (US)

(72) Inventors: Christopher Galliano, New Orleans, LA (US); Raed Albuliwi, Lewisville, TX (US); Kent Laursen, Slidell, LA (US)

( * ) Notice: Subject to any disclaimer, the term of this patent is extended or adjusted under 35 U.S.C. 154(b) by 199 days.

(21) Appl. No.: 15/398,367

(22) Filed: Jan. 4, 2017

Related U.S. Application Data (60) Provisional application No. 62/366,947, filed on Jul. 26, 2016.

(51) Int. Cl.
*H04L 29/06* (2006.01)
*G06F 30/20* (2020.01)

(52) U.S. Cl.
CPC .......... *H04L 63/1425* (2013.01); *G06F 30/20* (2020.01); *H04L 63/1433* (2013.01)

(58) Field of Classification Search
CPC ............. H04L 63/1416; H04L 63/1408; H04L 63/1441; H04L 63/1458; G06F 21/552

USPC .......................................................... 726/23
See application file for complete search history.

(56) References Cited

U.S. PATENT DOCUMENTS

| | | | |
|---|---|---|---|
| 2016/0191559 A1* | 6/2016 | Mhatre | H04L 63/1416 726/23 |
| 2017/0126727 A1* | 5/2017 | Beam | H04L 63/20 |
| 2017/0237752 A1* | 8/2017 | Ganguly | H04L 63/1416 726/25 |

* cited by examiner

*Primary Examiner* — Evans Desrosiers
(74) *Attorney, Agent, or Firm* — Andrew G. Vicknair (57) ABSTRACT

A system and method for joining various cyber security threat data sources into a single threat data model, analyzing this threat data and storing the data as a specific data model, processing the data to standardize, minimize, interpret and catalogue the threat data, creating a meta-model based on the cyber threat data model, creating executable models based on this cyber threat data enabling simulations of this cyber threat's behavior, enabling execution of these simulations to capture quantifiable data observations of cyber threat behavior in the context of logical configurations of networks, devices and systems which may be specified as models of information environments and IT infrastructures, interpreting the results of the simulations; and generating output based on the results of the simulations.

1 Claim, 7 Drawing Sheets

SYSTEM AND METHOD FOR ANALYZING DATA AND USING ANALYZED DATA TO DETECT CYBER THREATS AND DEFEND AGAINST CYBER THREATS

CROSS REFERENCE TO RELATED APPLICATIONS

This application claims the benefit of U.S. provisional application Ser. No. 62/366,947 filed on Jul. 26, 2016.

TECHNICAL FIELD

The present invention relates, in general to data analysis and data comparison systems and methods, and more specifically to analyzing various cyber threat intelligence data and using this analyzed data to detect cyber threats and to protect and defend against cyber threats.

BACKGROUND OF INVENTION

Over the years, the use of computers has increased significantly and with that use, the use of the Internet and various computer networks has also increased. Unfortunately with the increased number of computer and computer network users, the number of hackers, computer viruses, malware, spyware and other attacks have also significantly increased. These viruses, malware, spyware, and other computer attacks are dangerous and can lead to lost productivity with computer downtime and can also cause data destruction. Unfortunately, these viruses, malware, and spyware have even been able to corrupt very secure government networks, which raises serious concerns that must be addressed.

Some sources have estimated that approximately 16 million households in the US are affected with a "serious" computer virus. Additionally, computer viruses and malware have cost businesses billions of dollars in downtime and costs/expenses associated with actions required to remove the viruses and malware. Malware can also cause problems with reducing user time, transmitting confidential data, such as personal information and passwords, and corrupting various files and destroying data.

Accordingly, a need exists in the art for a system and method that can analyze data to detect cyber threats before the cyber threats attack and then use that analyzed data to defend against any cyber threats.

BRIEF SUMMARY OF THE INVENTION

The present invention is directed to a system and method for joining various cyber security threat data sources into a single threat data model; analyzing this threat data and storing the data as a specific data model; processing the data to standardize, minimize, interpret and catalogue the threat data; creating a meta-model based on the cyber threat data model; creating executable models based on this cyber threat data enabling simulations of this cyber threat's behavior to be produced; enabling execution of these simulations to capture quantifiable data observations of cyber threat behavior in the context of logical configurations of networks, devices and systems which may be specified as models of information environments and IT infrastructures captured using such standards as the Department of Defense Architecture Framework (DoDAF), United Architecture Framework (UAF) or Systems Engineering Modeling Language (SysML) models; interpreting the results of the simulations; and generating output based on the results of the simulations.

In one embodiment of the present invention, the output generated from the results of the simulations may be cyber threat alerts that are transmitted to a front-end system or distributed via messaging using a publishing and subscription scheme. In another embodiment, the outputs may be quantified through one or more risk management framework(s) and then transmitted to a visualization front-end systems or to some type of report generating software. In another embodiment, the output generated from the simulation results could be consumed by automated defense analytics to (1) transmit decisions to front-end systems to reconfigure network device infrastructure to defend against cyber threats, (2) generate new configurations for network device infrastructure to defend against cyber threats, and/or (3) transmit new configurations to specific networked devices (such as firewalls, routers, switches, servers, end-point systems etc.) to defend against targeted cyber threats.

In other embodiments, the output generated from the simulations may generate some form of predictive analytics that may be transmitted to a front-end visualization as a sequence of potential risks based on the results of simulations of cyber threat capabilities. One embodiment may also be configured so that the output generated from a result of the simulations are forwarded into a continuous learning machine that will consume the results and real-time cyber threat data and provide alerts in real-time to a front-end system.

The foregoing has outlined rather broadly the features and technical advantages of the present invention in order that the detailed description of the invention that follows may be better understood. Additional features and advantages of the invention will be described hereinafter, which form the subject of the invention. It should be appreciated that the conception and specific embodiment disclosed may be readily utilized as a basis for modifying or designing other structures for carrying out the same purposes of the present invention. It should also be realized that such equivalent constructions do not depart from the invention. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
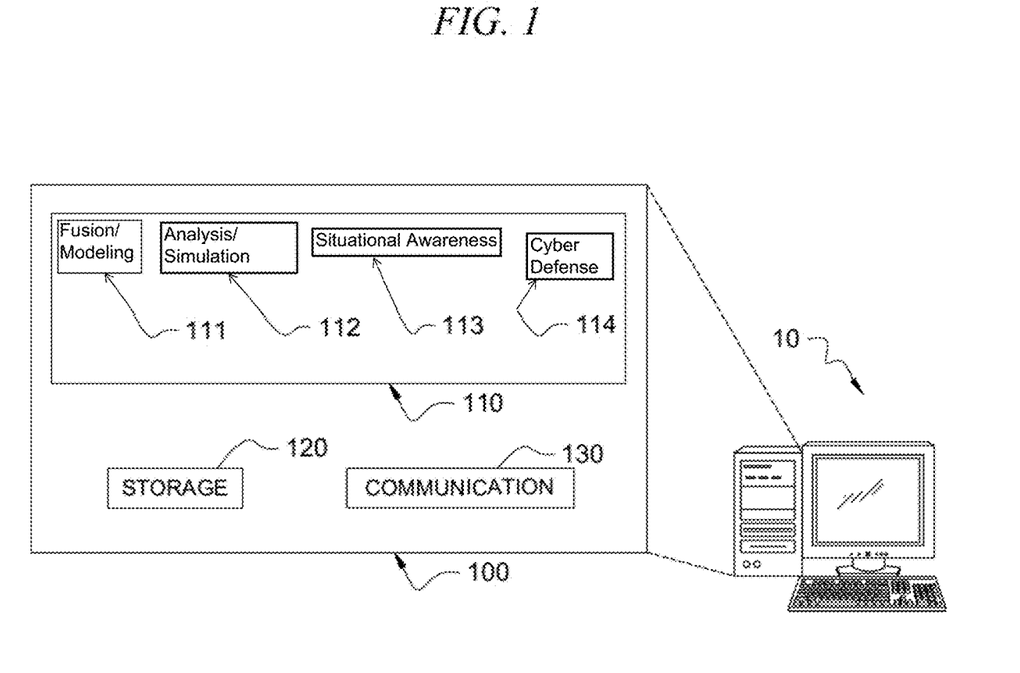
FIG. 1 is an illustration of a general architecture of a system of one embodiment of the present invention.

FIG. 1 is a diagram illustrating data analysis-modeling-processing-generation environment 100 according to one embodiment of the present invention implemented on computer 10 for analyzing and modeling data to process that data and then generate various outputs that may consist of a cyber-threat alert. In one embodiment, a cyber-threat alert may be generated and then transmitted to a visualization front-end system.

In the present invention, data from various cyber security sources, such as data repositories, malware reporting, anti-virus analysis, and various third-party services, are transmitted to a malware modeling module and data models are created and stored in a data repository as cyber-threat data models that represent malicious software or cyber-threat meta-data. Analytics may then be applied to the cyber-threat data models in order to standardize, minimize and interpret the threat data within some type of database. A meta-model is then created based on the cyber-threat data model and then an executable model is created that allows various simulations to be produced. The simulations may be applied to a network device configuration and predefined rules and/or algorithms will interpret the results of the simulations. Based upon the results of the simulations, one or more outputs are generated, such as a cyber-threat alert that may be transmitted to a front-end system.

In addition to data analysis-modeling-processing-generation environment 100, the computer system may include an operating system, a computer's coordinating program that is built on the instruction set for a processor or microprocessor, and the hardware that performs the logic operations and manages the data movement of the computer.

Data analysis-modeling-processing-generation environment 100 represents one application running on computer 10. In one embodiment of the present invention, data analysis-modeling-processing-generation environment 100 includes data module 110, storage module 120, and communication module 130. Data module 110 may also include a number of different levels/sub-modules, such as fusion/modeling sub-module 111, analysis and simulation sub-module 112, situational awareness sub-module 113 and cyber defense sub-module 114. Data analysis-modeling-processing-generation environment 100 is advantageous as it may be used to analyze cyber-threat data, process and model the cyber-threat data, and generate actionable outputs to assist with combatting cyber-threats such as real-time threat mitigation countermeasures, alerts, and notifications.

Although FIG. 1 illustrates data module 110 with only four sub-modules, fusion/modeling sub-module 111, analysis and simulation sub-module 112, situational awareness sub-module 113 and cyber defense sub-module 114, the present invention is not limited to this configuration. In alternative embodiments of the present invention, data module 110 may include several other sub-modules in addition to sub-modules 111, 112, 113, and 114.

Storage module 120 enables the saving and storing of data, such as the threat data that is sourced and obtained from various data sources. After the threat data is obtained from various cyber-threat data sources, it may be stored in storage module 120. This data may then be analyzed to standardize, minimize, interpret, and catalogue and store the threat data as a cyber-threat model in storage module 120 which allows the user to save such data.

Storage module 120 may also allow a user to save any specific data that is analyzed during the data analysis process. A meta-model may then be constructed based on the cyber-threat data model consisting of rules and constraints for describing the threat data. These meta-models may also be stored in storage module 120.

Communication module 130 enables a user to communicate with others and access external databases located in remote locations when in the process of analyzing and validating data in using the present invention. In one embodiment of the present invention, this is accomplished by communication module 130 communicating with various external data sources containing cyber-threat data such as repositories, malware reporting, anti-virus analysis and other third-party sources handling such data.

Communication module 130 may communicate data, such as various outputs that are generated by the present invention. For instance, cyber-threat alerts, actionable querying, alerts, reporting, and/or automated defense may be communicated via communication module 130.

Figure 2:
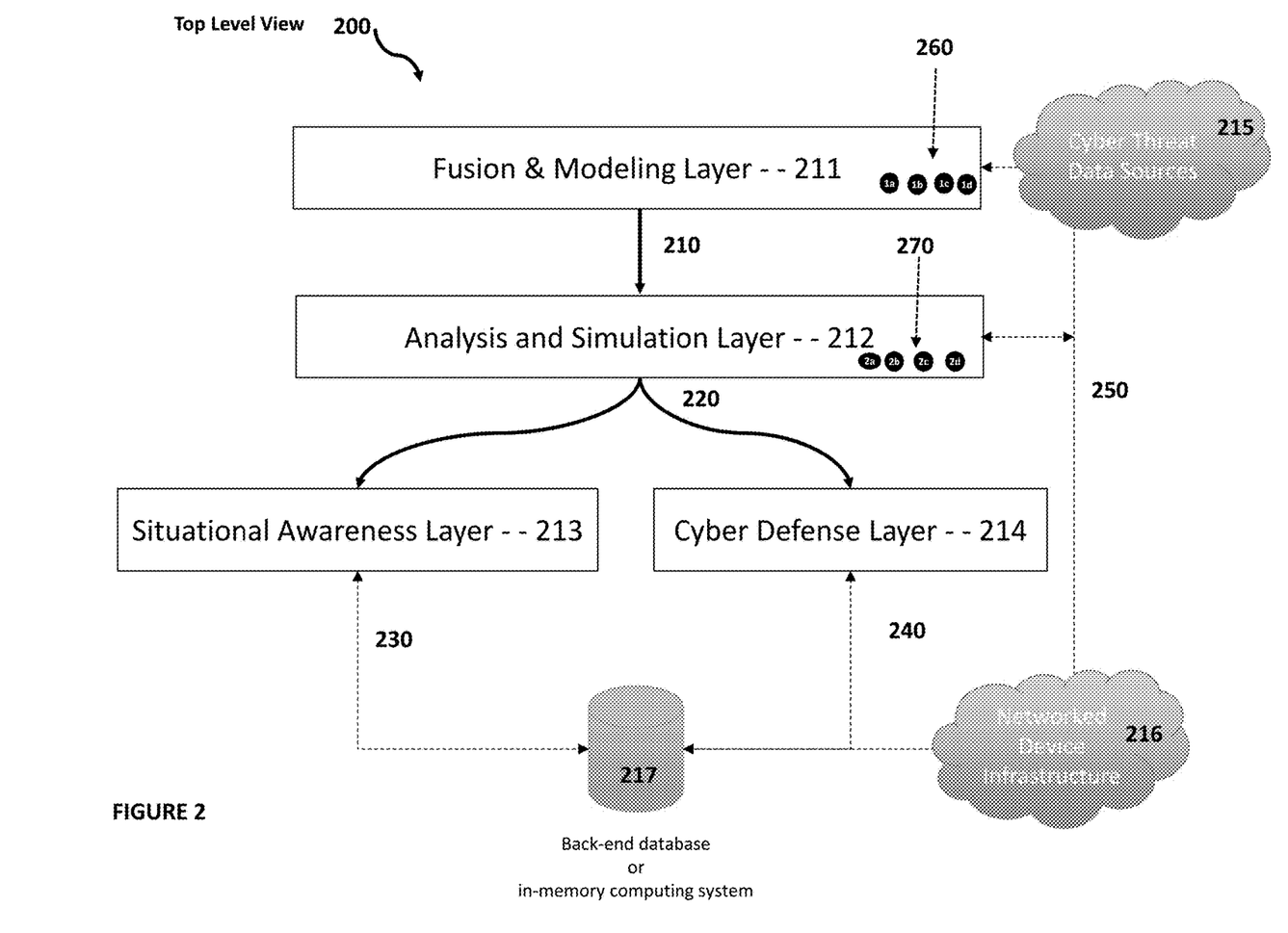
FIG. 2 illustrates a top level view of an embodiment of the present invention.
Figure 3:
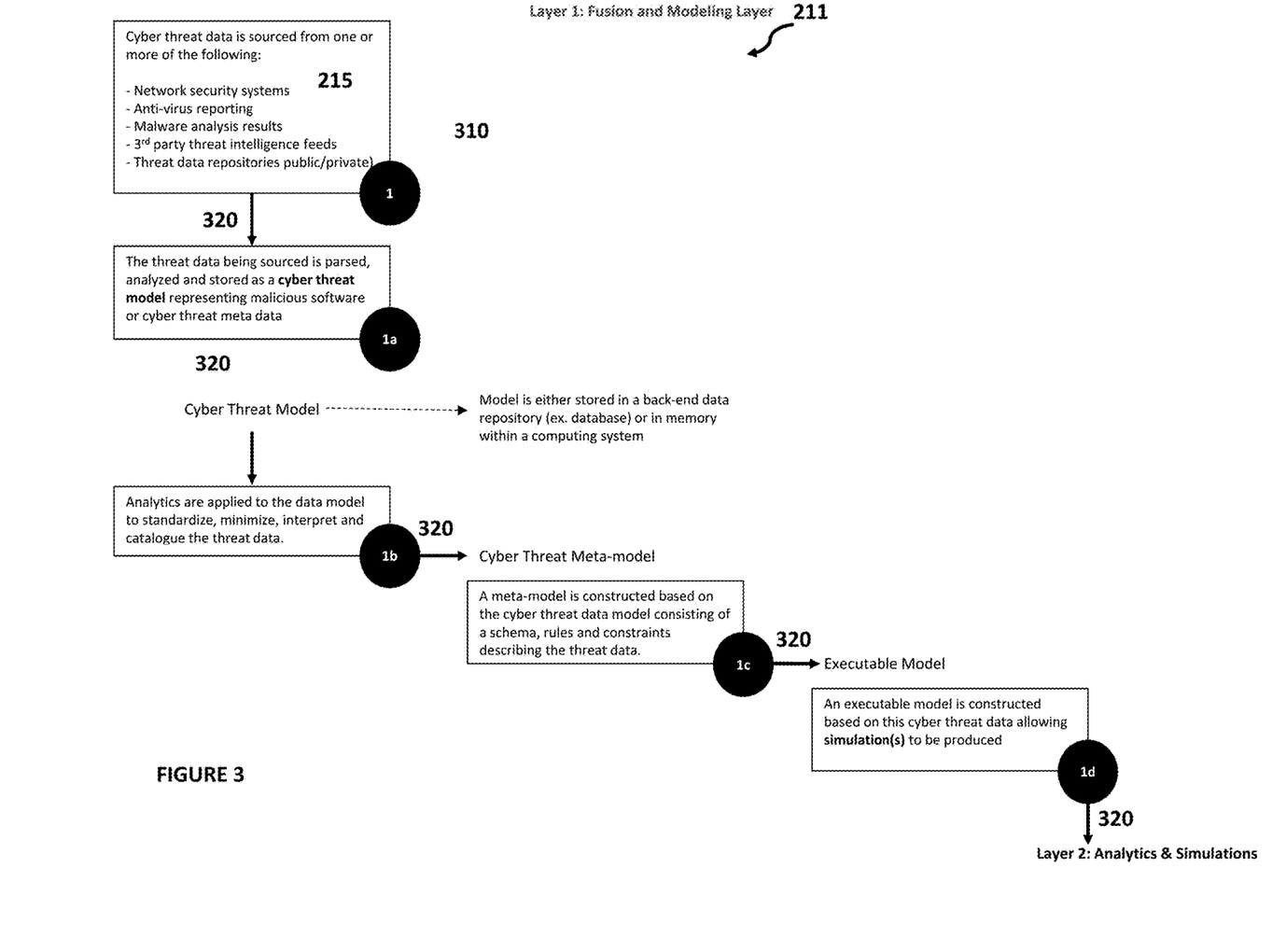
FIG. 3 illustrates one level of an embodiment of the present invention.

FIG. 2 illustrates a top level graphical view of an embodiment of the present invention. As illustrated in FIG. 2, top level view 200 includes four (4) specific layers illustrated by fusion and modeling layer 211, analysis and simulation layer 212, situational awareness layer 213 and cyber defense layer 214. In one embodiment of the present invention, fusion and modeling layer 211 includes a series of steps illustrated by steps 260 that are further indicated as 1a-1d. The steps 260 illustrate a series of actions that may occur in fusions and modeling layer 211 that are explained and illustrated in FIG. 3. While FIGS. 2 and 3 illustrate steps 260 as at least four (4) steps, the present invention is not limited to this configuration as alternative embodiments may comprise more than four (4) or less than four (4) steps within fusion and modeling layer 211.

Figure 4:
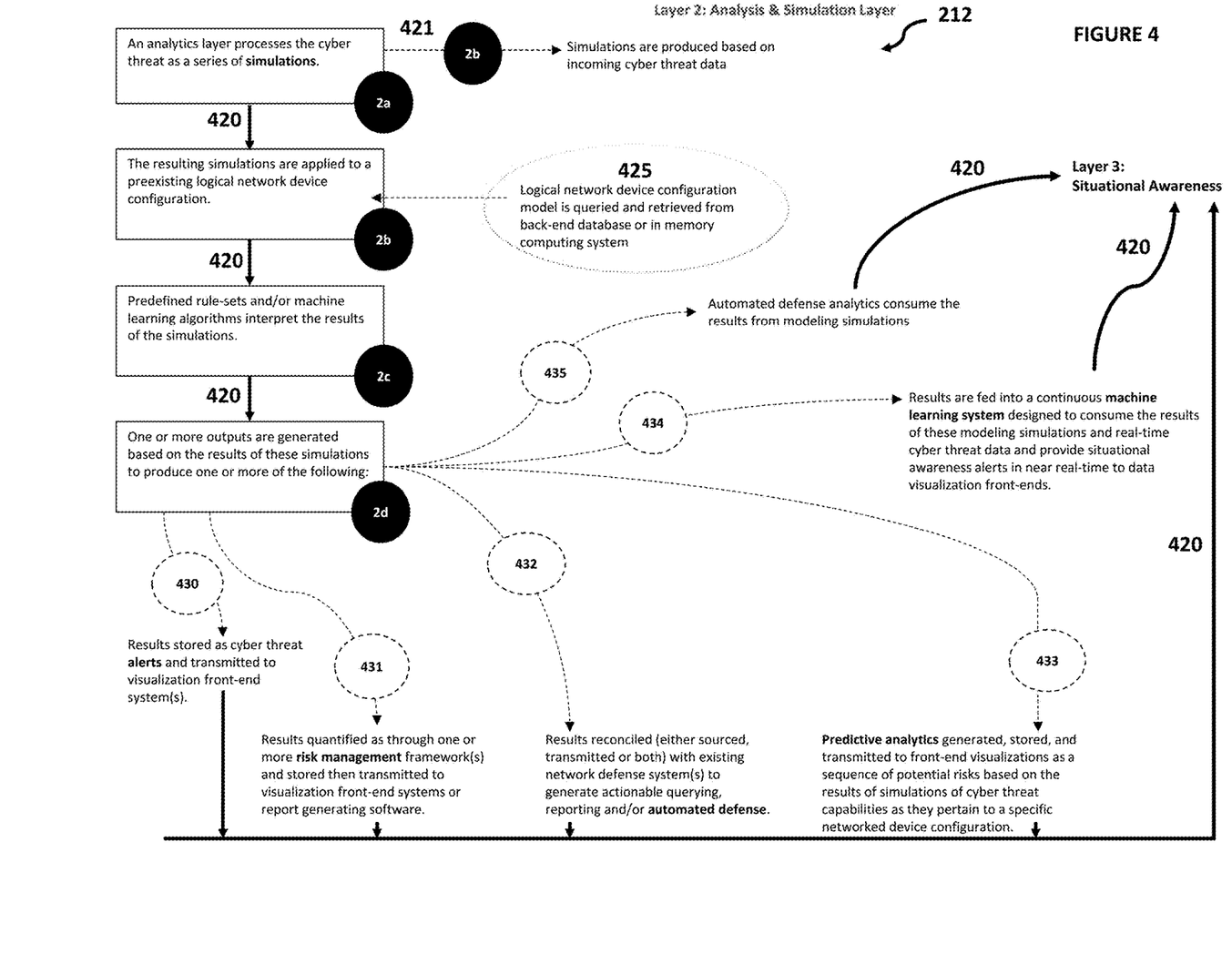
FIG. 4 illustrates another level of an embodiment of the present invention.

In one embodiment of the present invention, analysis and simulation layer 212 also includes a series of step illustrated by steps 270 that are further indicated as 2a-2d. The steps 270 illustrate a series of actions that may occur in analysis and simulation layer 212 that are explained and illustrated in FIG. 4. While FIGS. 2 and 4 illustrate steps 270 as at least four (4) steps, the present invention is not limited to this configuration as alternative embodiments may comprise more than four (4) or less than four (4) steps within analysis and simulation layer 212.

As illustrated in FIG. 2, the flow between the four (4) different layers starts at fusion and modeling layer 211 and then proceeds from fusion and modeling layer 211 to analysis and simulation layer 212 as illustrated by flow 210.

After analysis and simulation layer 212, the flow may proceed to both situational awareness layer 213 and cyber defense layer 214 as illustrated by flow 220. After situational awareness layer 213, the flow may proceed to database 217 as illustrated by flow 230. Additionally, the flow 230 between situational awareness layer 213 and database 217 is bidirectional in that flow 230 may go back and forth between situational awareness layer 213 and database 217.

After cyber defense layer 214, the flow may proceed to database 217 as illustrated by flow 240. Additionally, the flow 240 between cyber defense layer 214 and database 217 is bidirectional in that flow 240 may go back and forth between cyber defense layer 214 and database 217.

FIG. 2 also illustrates cyber threat data sources 215 and network device infrastructure 216. Cyber threat data sources 215 represents the cyber threat data that may be obtained from various sources such as network security systems, anti-virus reporting, malware analysis results, third party threat intelligence feeds, private and/or public threat data repositories, and the like. The cyber threat data sources are gathered and used by the present invention and particularly in the fusion and modeling layer 211 and by fusion/modeling sub-module 111. In addition, the cyber threat data sources may also be used in the analysis and simulation layer 212 and by the analysis/simulation sub-module 112.

In one embodiment of the present invention, fusion/modeling sub-module 111 of data module 110 may perform a series of operations/functions that will ultimately create an executable model based on various cyber-threat data. FIG. 3 illustrates the actions and steps 260 that occur in fusion and modeling layer 211 and occur within fusion/modeling sub-module 111 according to one embodiment of the present invention. Thus, the steps 260 illustrated in FIG. 3 are the steps/functions taken by fusion/modeling sub-module 111 in the fusion and modeling layer 211. In addition, FIG. 3 illustrates the flow 320 that occurs between the various steps 260 that are specifically illustrated in FIG. 3 as 1*a*-1*d* that specifically illustrate the steps that fusion/modeling sub-module 111 of data module 110 may perform. Fusion and modeling layer 211 illustrated by FIG. 3 also includes a beginning block 310, also illustrated as number 1, that represents the gathering of cyber threat data sources 215, which may be gathered/obtained from various sources such as network security systems, anti-virus reporting, malware analysis results, third party threat intelligence feeds, private and/or public threat data repositories, and the like.

In particular, fusion/modeling sub-module 111 of data module 110 may gather and review cyber-threat data obtained from various sources such as network security systems, anti-virus reporting, malware analysis results, third party threat intelligence feeds, private and/or public threat data repositories, and the like. After obtaining and gathering the cyber-threat data in beginning block 310, flow 320 of FIG. 3 proceeds to step 1*a*. In the present invention, sub-module 111 may parse and analyze that threat data and then store the analyzed threat data as a cyber-threat model that represents malicious software or cyber threat meta-data. Step 1*a* of FIG. 2 of the fusion and modeling layer 211 represents these acts of fusion/modeling sub-module 111 of parsing and analyzing the cyber-threat data and storing the analyzed data as a cyber-threat model. This cyber-threat model may be stored in a back-end data repository, such as a database 217 or can be stored in memory within a computing system, such as computer 10. After step 1*a* of FIG. 3, flow 320 proceeds to step 1*b*.

In step 1*b* of FIG. 2 of the fusion and modeling layer 211, analytics or some form of computational analysis is preferably applied by fusion/modeling sub-module 111 of data module 110 to the cyber-threat model in order to standardize, minimize, interpret and catalogue the threat data. After step 1*b*, flow 320 proceeds to step 1*c*. In step 1*c* of FIG. 2 of the fusion and modeling layer 211, a cyber-threat meta-model is created by fusion/modeling sub-module 111 of data module 110 based upon the cyber-threat data model which cyber-threat meta-model consists of rules, schema, and constraints that describe the threat-data.

After the cyber-threat meta-model is created, sub-module 111 of data module 110 constructs an executable model based upon the cyber-threat data. In particular, after the cyber-threat meta-model is created in step 1*c*, flow 320 proceeds to step 1*d*. In step 1*d*, the executable model is constructed so that simulations are allowed to be produced. After the executable model is constructed in step 1*d*, flow 320 proceeds to the analysis and simulation layer 212. Analysis and simulation layer 212 is illustrated in FIG. 4. FIG. 4 also illustrates a number of steps 270 that are further indicated as 2*a*-2*d*. The steps 2*a*-2*d* illustrate a series of actions that may occur in analysis and simulation layer 212. In one embodiment of the present invention, steps 2*a*-2*d* are performed by analysis and simulation sub-module 112 of data module 110.

As illustrated in FIG. 4, step 2*a* of analysis and simulation layer 212, may process or "run" the cyber-threat through an executable model as a series of simulations. In one embodiment, after step 2*a*, the process may flow to the right of step 2*a*, as illustrated by flow 421, where the simulations are produced based on incoming cyber-threat data. In such a configuration, an advanced vulnerability analysis is performed based on incoming cyber-threat data.

In one embodiment, after step 2*a*, flow 420 may proceed down to step 2*b*. In this step 2*b*, analysis and simulation sub-module 112 may apply the simulations to a preexisting logical network device configuration model. As illustrated by query step 425, the logical network device configuration model is queried and retrieved from a back-end database or from memory in a computing system. These simulations produce a number of results.

After step 2*b*, flow 420 proceeds to step 2*c*. In step 2*c* of analysis and simulation layer 212, analysis and simulation sub-module 112 processes the results of the simulations by interpreting the results of the simulations with various pre-defined rule-sets and/or machine learning algorithms. These rule-sets and algorithms represent both static "known bad" threat indicators for example, threat meta data consisting of malicious tools used to compromise or conduct a network intrusion, as well as anomaly based algorithms that scan for new threat data and make decisions based on machine learning—for example, an unusual network connection from a computer system not part of the logical network configuration. During the interpretation process, the system scans the logical network device configuration model for these malicious indicators or indicators of compromise and makes decisions which include removing false positives and ranking the most relevant simulation results in order of "most likely" to "least likely."

After the simulation results are interpreted in step 2*c* of analysis and simulation layer 212, flow 420 proceeds to step 2*d*. In step 2*d* of analysis and simulation layer 212, analysis and simulation sub-module 112 may generate a number of actionable outputs based upon the results of the simulations. The outputs are illustrated in FIG. 4 as 430-435 and may consist of any number of actions. In one instance, the output may be stored as a cyber-threat alert that may be transmitted to a visualization front-end system(s), as illustrated by output 430. In one embodiment, the cyber-threat alert may be some type of a notification sent to a user to notify the user of the existence of a cyber-threat.

In one embodiment, in addition to and/or instead of a cyber-threat alert, analysis and simulation sub-module 112 may generate an output where the results are quantified through one or more risk management frameworks that are stored and then transmitted to a visualization front end system(s) or some report generating software, as illustrated by output 431. The integration of cyber threat analytics with risk management supports the determination of cyber threat impacts on operations based on assessed risks and vulnerabilities, enabling prioritization and targeting of cyber defense mitigations. Another output may be generated whereby the results are reconciled with existing network defense system(s) to generate some actionable querying, reporting and/or automated defense, as illustrated by output 432.

In another embodiment, an output is generated that is predictive analytics that are generated, stored, and transmitted to front-end visualizations as a sequence of potential risks that are based on the results of the simulations of cyber threat capabilities as they pertain to a specific network device configuration, as illustrated by output 433. In one instance, the output may identify specific device(s) and score the risk(s) posed to the operational integrity of the identified device and any interconnected devices. These calculations are based on how crucial the affected network device or computing system is to the overall operational construct of the entire system and attempt to rate the severity, degradation or complete loss of the device to the overall system's behavior. For example, if the affected device is a router which provides the sole data path to the Internet for the system, then the operational integrity of the entire system may be rated "catastrophic," as this device provides the sole source of communication for the system with the outside world.

Another output is feeding the results of the simulations into a continuous machine learning system that is designed to consume the results of the simulations and the real time cyber-threat data and provide situational awareness alerts in near real-time to data visualization front-end system(s), as illustrated by output 434. These front-end system(s) or "dashboards" represent high level views and executive summaries of the system in the form of charts, graphs, metrics and immediate "need to know" information for the system stakeholder. Any/all alerts generated and sent to these front-end system(s) require immediate notification that the system has simulated, calculated or scored a threat that is relevant to the existing network device infrastructure. In another embodiment of the present invention, an output is generated whereby the results of the modeling simulations are consumed by automated defense analytics, as illustrated by output 435.

In one embodiment, output 435 is configured so that the results of the modeling simulations are consumed to (1) transmit decisions to a data visualization front-end(s) to reconfigure networked device infrastructure in order to defend against cyber-threat capabilities; (2) generate new configurations for networked device infrastructure to defend against cyber-threat capabilities; and/or (3) transmit new configurations to specific networked devices, such as firewalls, routers, switches, servers, end-point systems and the like, to defend against targeted cyber threat capabilities. In one embodiment, the various outputs are stored in some form of data base, such as a back-end database, or in memory in the computing system. In one embodiment, one or more of the outputs generated, such as outputs 430-435, in analysis and simulation layer 212 by sub-module 112 could be generated at any time as the present invention is not limited to generating a single output. Further, analysis and simulation sub-module 112 is advantageous as the cyber-threat is undergoing simulation in sub-module 112 and various outputs that can be generated produce meaningful data to an end user.

Figure 5:
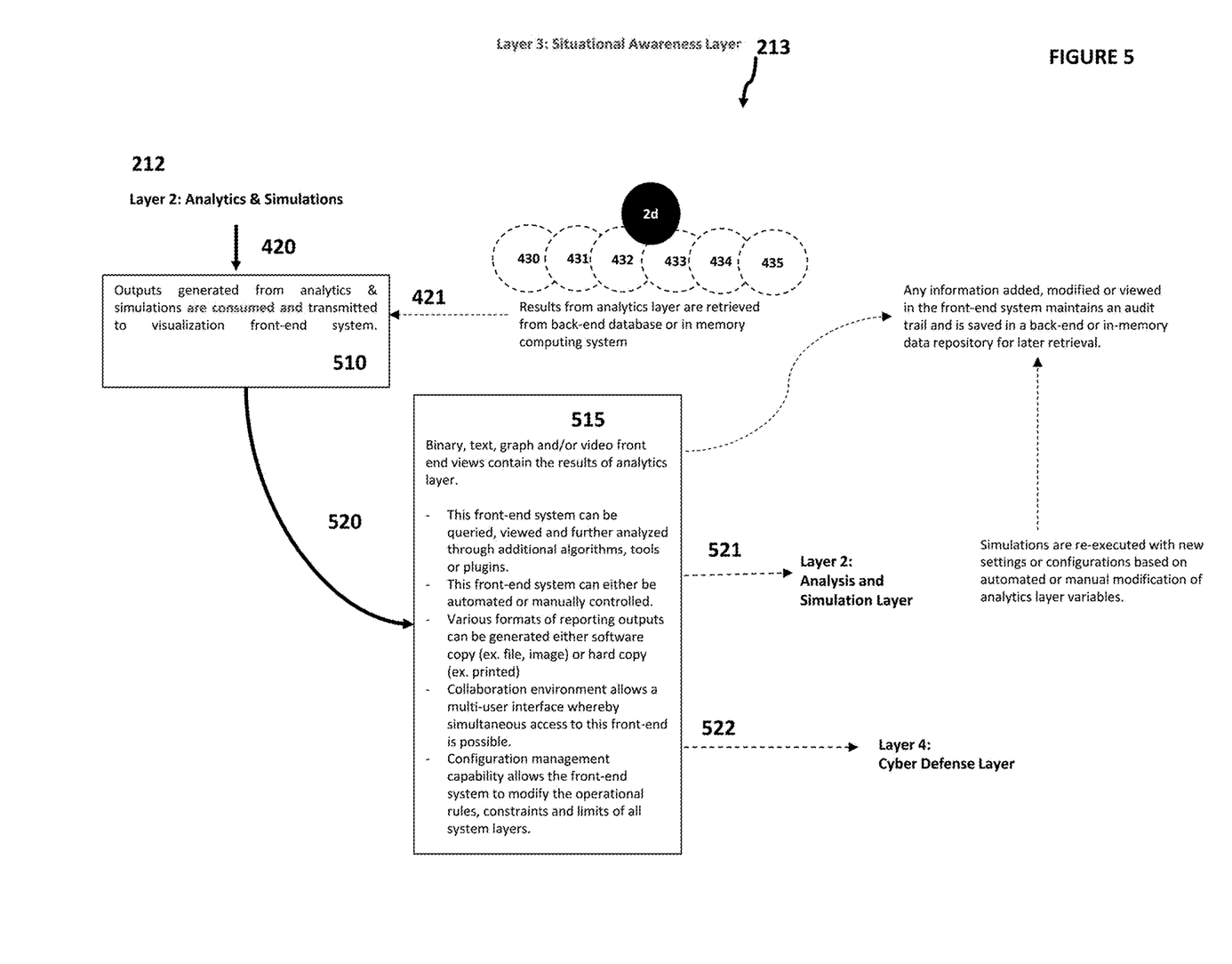
FIG. 5 illustrates another level of an embodiment of the present invention.

After the various outputs are generated in analysis and simulation layer 212 by analysis and simulation sub-module 112, flow 420 proceeds to situational awareness layer 213. As illustrated in FIG. 5, the outputs from analysis and simulation layer 212 flow into situational awareness layer 213 as illustrated by flow 420. These outputs 430-435 from analysis and simulation layer 212 may flow directly from analysis and simulation layer 212 to action box 510, or the outputs/results from analysis and simulation layer 212 from sub-module 112 may be retrieved from a database or in a memory computing system where the results were stored as illustrated in flow 421. Flow 420 and 421 proceed to action box 510 of FIG. 5.

After the outputs 430-435 are in situational awareness layer 213, situational awareness sub-module 113 may consume the potential outputs from analysis and simulation sub-module 112 and transmit the outputs to a visualization front-end system, as illustrated in action box 510. As illustrated in FIG. 5, after the outputs are consumed in action box 510, flow 520 of FIG. 5, will continue to action box 515. In action box 515, situational awareness layer 213 through situational awareness sub-module 113 may provide a user interface whereby data may be presented in a binary, text, graph, and/or video front end view(s) that contain the results of the outputs generated in sub-module 112.

The present invention may also be configured so that in action box 515 in situational awareness layer 213 through situational awareness sub-module 113, the front-end system can be queried, viewed and further analyzed through additional algorithms, tools or plugins. The front-end system provides users with a software user interface designed to access, monitor, query and configure all aspects of invention. In addition, in situational awareness layer 213 situational awareness sub-module 113 may interact with the front-end system so that the front-end system may be automated or manually controlled. In addition, various reports can be generated in sub-module 113. These reports may be generated in the form of a software copy, such as a file and/or image, or may be generated in hard copy, such as some type of report that may be printed.

In one embodiment of the present invention, situational awareness layer 213 through sub-module 113 may also control the front-end system so that a collaboration environment is created whereby there is a multi-user interface whereby simultaneous access to this front-end is possible. In addition, in one embodiment, situational awareness layer 213 through sub-module 113 provides a configuration management capability that will allow the front-end system to modify the operational rules, constraints and limits of all system layers. In one embodiment, this configuration management capability may occur in action box 515.

Sub-module 113 also maintains an audit trail so that any information that is added, modified or viewed in the front-end system can be saved in a database so that such information will be available for later retrieval. As an example, the system user may generate a rule-set for the simulation based on new threat data and save that rule within the system. Another example may involve the user adding or removing network devices from the logical device configuration model. Both of these modifications would leave an audit trail which can be accessed at a later time denoting who made these changes as well as the timestamp.

In one embodiment, situational awareness layer 213 through situational awareness sub-module 113 can consume the previous simulations and route those simulations back to the previous layers, such as analysis and simulation layer 212 as illustrated by flow 521 of FIG. 5 so that the simulations may be re-executed with new settings or configurations based on automated or manual modification of variables through the use of a user interface. In another embodiment, the present invention may be configured so that the various outputs of situational awareness layer 213 may be viewed in a dash board, may be cycled back through the various layers, and/or may be routed to cyber defense layer 214 (illustrated in FIG. 6) as illustrated by flow 522 of FIG. 5.

Figure 6:
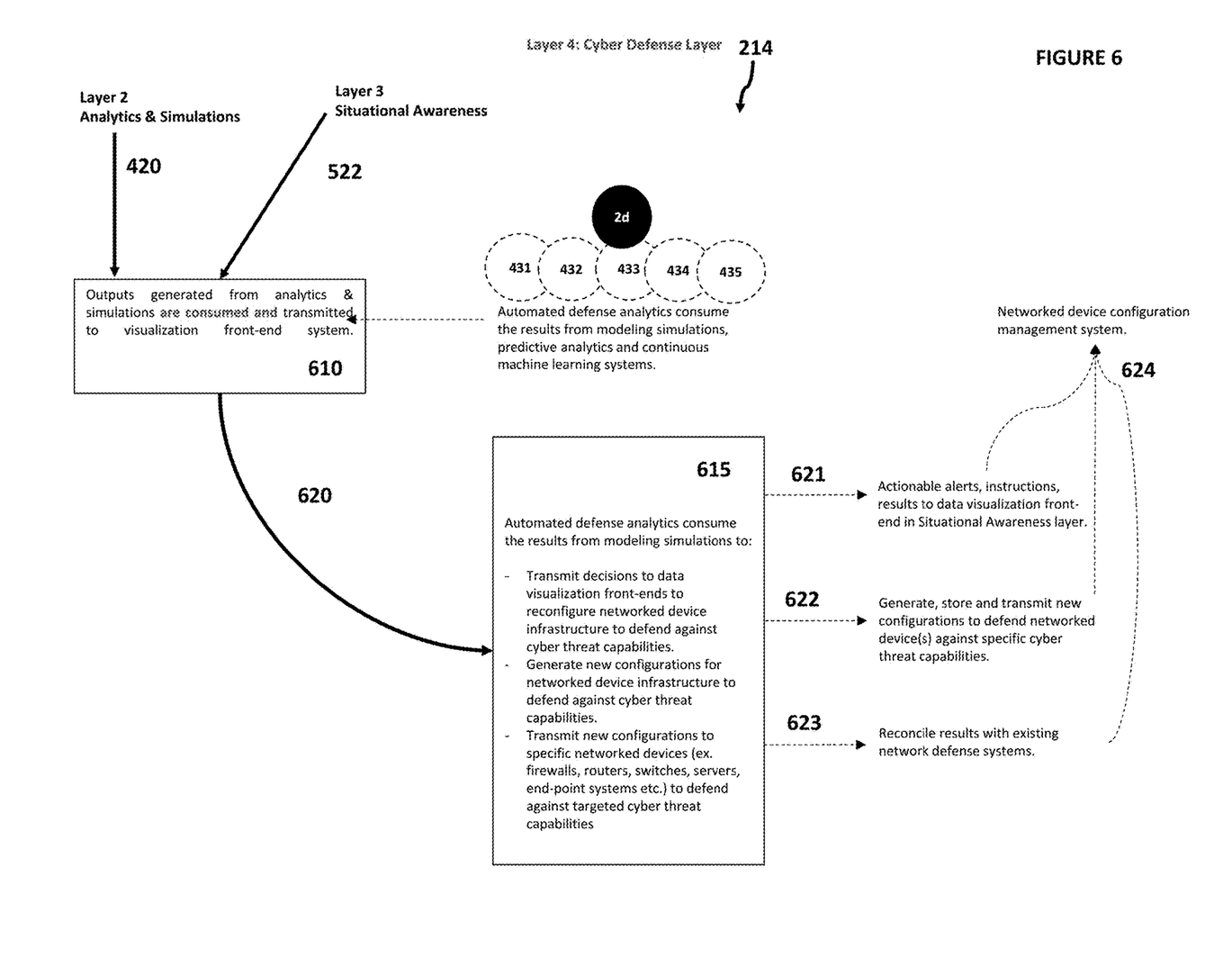
FIG. 6 illustrates another level of an embodiment of the present invention.

While the various outputs, 430-435, that are generated in analysis and simulation layer 212 via analysis and simulation sub-module 112 can be consumed in situational awareness layer 213 through situational awareness sub-module 113, these same outputs may be consumed and analyzed with outputs generated and transmitted to front-end systems in cyber defense layer 214. As illustrated in FIG. 6, flow 420 illustrates the flow of outputs generated in analysis and simulation layer 212, and flow 522 illustrates the flow of outputs generated in situational awareness layer 213. Flow 420 and 522 proceed to action box 610 of FIG. 6. As illustrated in FIG. 6, after the outputs are consumed in action box 610, flow 620 of FIG. 6, will continue to action box 615.

In action box 615, automated defense analytics consume the results from the modeling simulations generated in analysis and simulation layer 212 via sub-module 112. In consuming the results, cyber defense layer 214 through cyber defense sub-module 114 analyzes the results to transmit decisions, for example a decision may consist of a defensive measure to block an IP address at the firewall, or another decision would prevent files with a particular attachment from ending up in a user's email system, to data visualization front-end systems to reconfigure networked device infrastructure in order to defend against various cyber threat capabilities.

In other embodiments, cyber defense layer 214 through cyber defense sub-module 114 will analyze results from modeling simulations and generate new configurations for network device infrastructure to defend against various cyber threat capabilities. In addition, cyber defense layer 214 through cyber defense sub-module 114 may also transmit new configurations to specific network devices such as firewalls, routers, switches, servers and end-point systems, to defend against cyber threats. The various outputs generated by cyber defense layer 214 through cyber defense sub-module 114 can be manual or automated mitigation instructions to enable use by humans or machines. In one embodiment, cyber defense layer 214 through cyber defense sub-module 114 may generate actionable alerts, instructions, or results to a data visualization front-end in situational awareness sub-module 113 as illustrated by flow 621 of FIG. 6.

In an alternative embodiment, cyber defense sub-module 114 may generate, store, and transmit new configurations that will be used to defend various network devices against cyber-threat capabilities as illustrated by flow 622 of FIG. 6. Sub-module 114 may also reconcile and transmit results to existing network defense systems to prevent such cyber-threats as illustrated by flow 623 of FIG. 6. In addition, the present invention may be configured so that the various outputs/actions generated in layer 214 may be routed to a network device configuration management system as illustrated by flow 624 of FIG. 6.

The program code segments making up data analysis-modeling-processing-generation environment 100 can be stored in a computer readable medium or transmitted by a computer data signal embodied in a carrier wave, or a signal modulated by a carrier, over a transmission medium. The "computer readable medium" may include any medium that can store or transfer information. Examples of the computer readable medium include an electronic circuit, a semiconductor memory device, a ROM, a flash memory, and erasable ROM (EROM), a floppy diskette, a compact disk CD-ROM, an optical disk, a hard disk, a fiber optic medium, a radio frequency (RF) link, etcetera. The computer data signal that can propagate over a transmission medium such as electronic network channels, optical fibers, air, electromagnetic, RF links, etcetera. The code segments may be downloaded via computer networks such as the Internet, Intranet, and the like.

Figure 7:
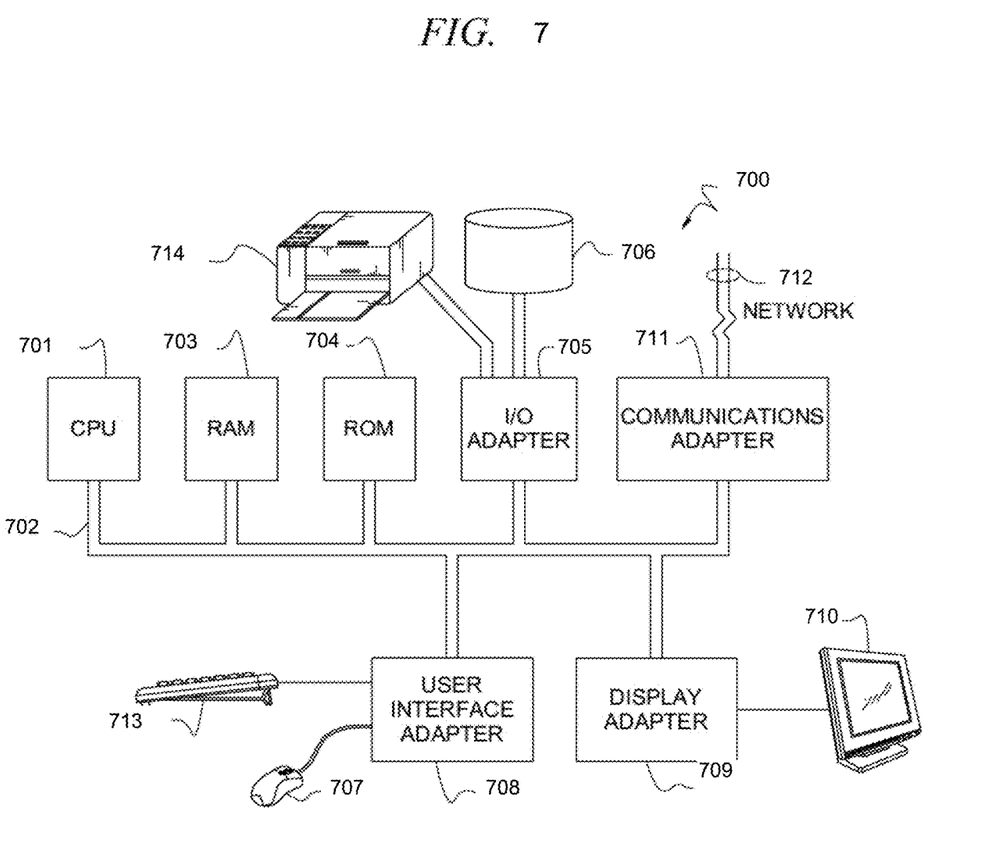
FIG. 7 depicts a block diagram of a computer system which is adapted to use an embodiment of the present invention.

FIG. 7 illustrates computer system 700 adapted to use embodiments of the present invention, e.g. storing and/or executing software associated with the embodiments. Central processing unit (CPU) 701 is coupled to system bus 702. The CPU 701 may be any general purpose CPU. However, embodiments of the present invention are not restricted by the architecture of CPU 701 as long as CPU 701 supports the inventive operations as described herein. Bus 702 is coupled to random access memory (RAM) 703, which may be SRAM, DRAM, or SDRAM. ROM 704 is also coupled to bus 702, which may be PROM, EPROM, or EEPROM. RAM 703 and ROM 704 hold user and system data and programs as is well known in the art.

Bus 702 is also coupled to input/output (I/O) controller card 705, communications adapter card 711, user interface card 708, and display card 709. The I/O adapter card 705 connects storage devices 706, such as one or more of a hard drive, a CD drive, a floppy disk drive, a tape drive, to computer system 700. The I/O adapter 705 is also connected to printer 714, which would allow the system to print paper copies of information such as documents, photographs, articles, etcetera. Note that the printer may be a printer (e.g. dot matrix, laser, etcetera), a fax machine, scanner, or a copier machine. Communications card 711 is adapted to couple the computer system 700 to a network 712, which may be one or more of a telephone network, a local (LAN) and/or a wide-area (WAN) network, an Ethernet network, and/or the Internet network. User interface card 708 couples user input devices, such as keyboard 713, pointing device 707, etcetera to the computer system 700. The display card 709 is driven by CPU 701 to control the display on display device 710.

Although the present invention and its advantages have been described in detail, it should be understood that various changes, substitutions and alterations can be made herein without departing from the invention. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized.

What is claimed is:

1. A non-transitory computer readable storage medium storing a program for detecting and defending against cyber threats, said program comprising:
   code for gathering data,
   code for generating data models based on said gathered data,
   code for generating meta-models based on said data models wherein said code for generating meta models comprises:
      code for analyzing said cyber threat model to interpret, standardize, and catalogue said cyber threat model; and code for generating a meta-model based on said analyzed cyber threat model wherein said meta-model is constructed based on said cyber threat model including rules and constraints describing said cyber threat model;
code for generating an executable model whereby said executable model allows simulations to be produced whereby said simulations will generate results wherein said code for generating an executable model comprises:
 code for analyzing said meta-model; and
 code for constructing an executable model based on said analyzed meta-model whereby said executable model allows simulations to be produced whereby said simulations will generate results;
code for applying said simulations wherein said code for applying said simulations comprises one or more of:
 code for processing said executable model as a series of simulations whereby said simulations are produced based upon said cyber threat data whereby said simulations produce results; and
 code for processing said executable model as a series of simulations whereby said simulations are applied to a preexisting logical network device configuration whereby said simulations produce results;
code for interpreting said results of said simulations wherein said code for interpreting said results of said simulations comprises:
 code for utilizing machine learning algorithms to interpret said results of said simulations; and
 code for scanning said results for threat data; and
code for generating one or more outputs wherein said code for generating one or more outputs comprises one or more of:

code for generating a cyber threat alert whereby said cyber threat alert is stored and transmitted to a visualization front-end system whereby said cyber threat alert is a notification of the existence of a cyber-threat sent to a user of said front-end system;
code for generating an output and quantifying said output through a risk management framework whereby said quantified output is stored and transmitted to a report generating software;
code for generating an output and reconciling said output with a network defense system whereby said network defense system will generate an automated defense to a cyber threat detected in said output;
code for generating predictive analytics and transmitting said analytics to a visualization front-end system as potential risks whereby said risks are based on simulations of cyber threats;
code for generating an output and feeding said output into a continuous machine learning system whereby said machine learning system consumes said output and provides alerts in near real time to a visualization front-end system; and
code for generating an output whereby said output conducts one or more of:
 transmits a decision to a visualization front-end system to reconfigure a network device:
 generates a new configuration for a network device infrastructure to defend against a cyber threat; and
 transmits a new configuration to specific network devices to defend against a cyber threat.

\* \* \* \* \*